Jan. 9, 1951     T. ANDERSEN     2,537,010
TRACTOR MOUNTED SHOVEL AND FRONT END LOADER
Filed June 23, 1948     3 Sheets-Sheet 1
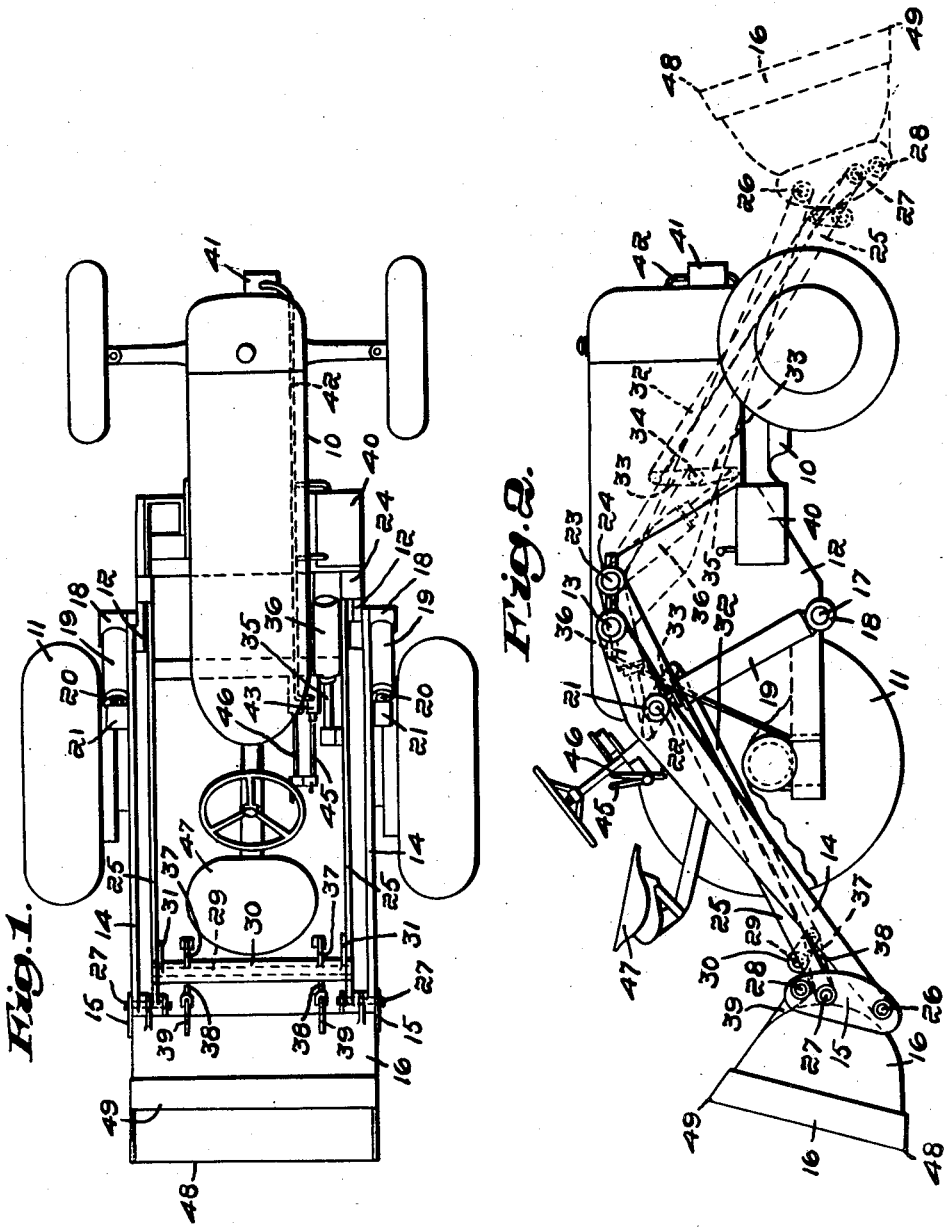

Jan. 9, 1951　　　T. ANDERSEN　　　2,537,010
TRACTOR MOUNTED SHOVEL AND FRONT END LOADER
Filed June 23, 1948　　　　　　　　　3 Sheets-Sheet 2
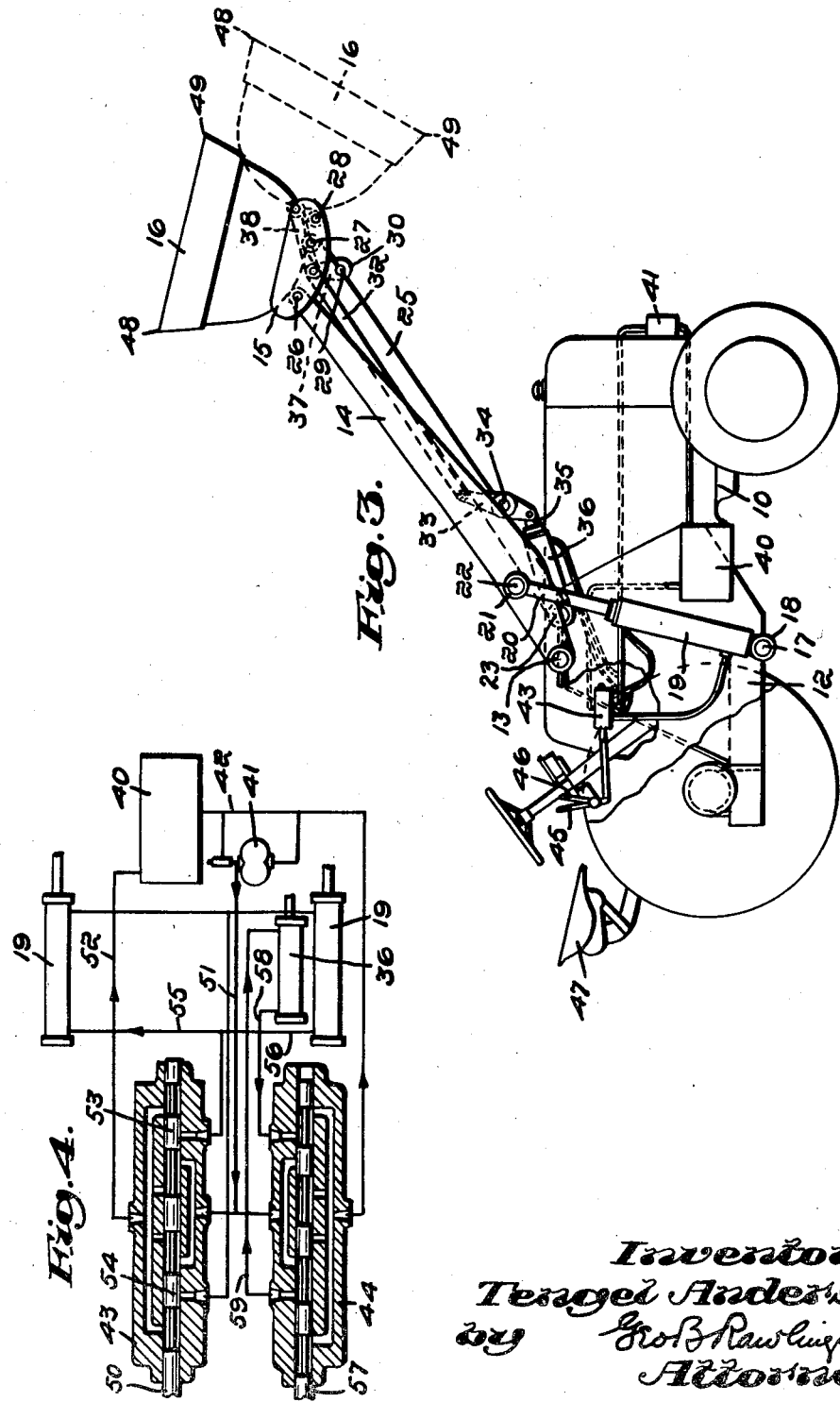

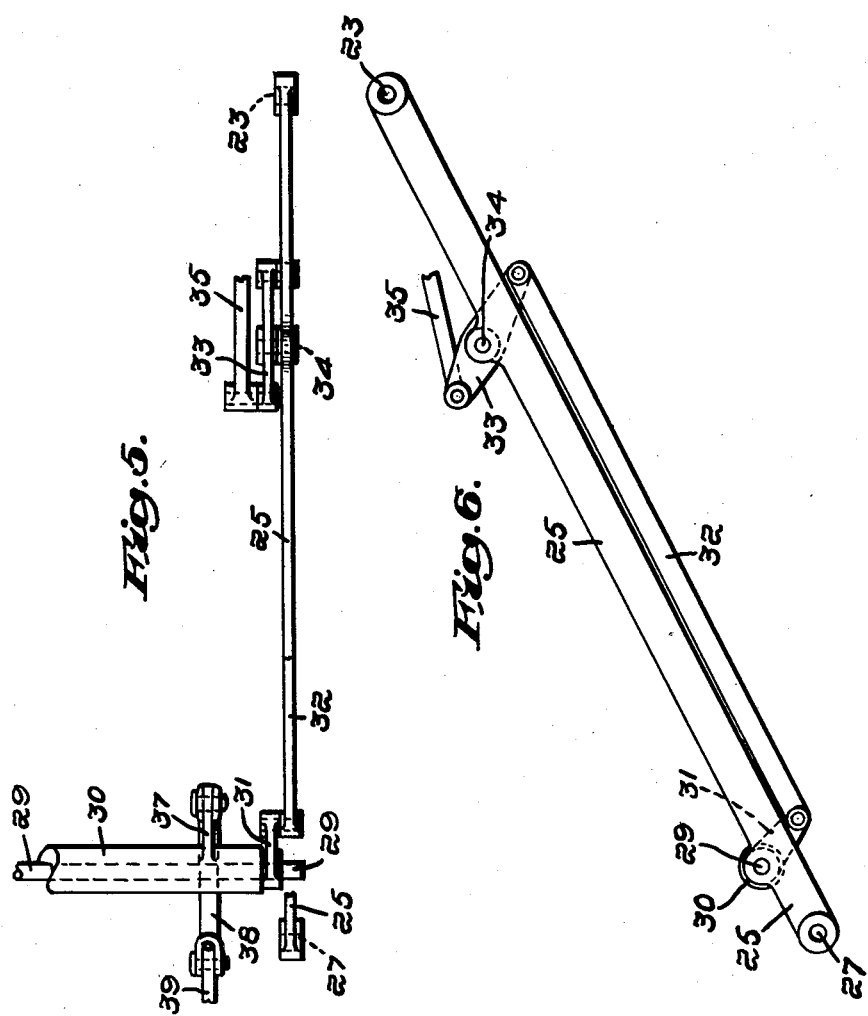

Patented Jan. 9, 1951

2,537,010

UNITED STATES PATENT OFFICE 2,537,010

TRACTOR MOUNTED SHOVEL AND FRONT END LOADER

Tengel Andersen, Port Richmond, N. Y.

Application June 23, 1948, Serial No. 34,718

6 Claims. (Cl. 214—140)

1

This invention relates to tractor shovels of the general type disclosed in my prior patent, No. 2,182,781, and has for its main object to provide a tractor shovel in which the material handling receptacle can be loaded at one end of the tractor and dumped at the other, or optionally can be both loaded and dumped at the same end of the tractor, thus combining in a single machine the advantages of an overhead shovel and a front end loader.

Other objects and advantages will appear as this description proceeds.

My present invention is based on the principle of so controlling the material handling receptacle that in passing from one end of the tractor to the other it will automatically re-position itself from one digging position to another.

In achieving my objects, I assemble the receptacle to the tractor by means of two independent pairs of arms pivoted at separate points to the receptacle and tractor, respectively. The inner ends of one pair of arms, hereinafter called the push arms, are pivoted to the sides of the tractor at points separate from the points at which the inner ends of the other pair of arms, hereinafter called the receptacle positioning arms, are pivoted to the tractor sides, and the outer ends of both the push arms and the positioning arms are likewise pivoted to the receptacle at separate pivot points. These several pivot points are all so disposed with relation to each other that as the two sets of arms are moved from ground level at one end of the tractor to substantially vertical position, the receptacle is revolved on its own pivots in the same direction as the two sets of arms are revolved during the first part of the lifting movement of the arms and receptacle from the ground and in the opposite direction from the revolution of the two sets of arms during the final part of the lift so that when the sets of arms pass through the vertical and approach ground level at the opposite end of the tractor the receptacle which at the start of the lifting cycle was positioned at one end of the tractor for digging with its bottom edge disposed toward the ground is automatically re-positioned for digging at the opposite end of the tractor with its opposite edge disposed towards the ground for digging.

For revolving the two sets of arms and the receptacle from digging position at one end of the tractor to dumping position after they have passed the vertical or optionally to a digging position at the opposite end of the tractor, I prefer to use a pair of hydraulic jacks, the cylinders

2 of which are pivotally fastened to the sides of the tractor at points lower than the pivot points for the inner ends of either set of arms. The pivot points for the jack cylinders are preferably in substantially the same vertical plane as the pivot points for the inner ends of the push arms, and the plungers of the jacks are pivoted to the push arms at points intermediate of the attachment points of said push arms to the sides of the tractor and to the receptacle.

For tilting the receptacle to break it out of the ground when loading or for tilting it downwardly to enable it to dump its load at the completion of the lifting cycle and restoring it to position after dumping, I prefer to use an independent hydraulic jack, the cylinder of which is pivoted to the sides of the tractor and the plunger of which is suitably connected to the positioning arms.

In the accompanying drawings wherein I have illustrated a preferred embodiment of my invention:

Figure 1 is a plan view of a tractor equipped in accordance with my invention, the receptacle being shown in digging position at the rear end of the tractor.

Figure 2 is a side elevation of Fig. 1, but also showing the receptacle and its operating mechanism by dash lines in digging position at the front end of the tractor.

Figure 3 is a view similar to Fig. 2, the receptacle and its operating mechanism being shown in full lines at the front end of the tractor in position to be dumped and in dotted lines in its dumping position.

Figure 4 is a diagram showing the fluid circuit for the hydraulic rams which control both the raising and lowering movements of the receptacle and also its dumping action.

Figure 5 is a fragmentary plan view on an enlarged scale of one of the receptacle positioning arms and associated parts, and Figure 6 is a side elevation of the structure shown in Fig. 5.

I have indicated at 10 a tractor of the wheeled type to the sides of which adjacent the rear wheels 11 thereof is fastened a pair of side plates 12. Journaled in the upper ends of the side plates 12 is a bearing shaft 13 on which are pivotally mounted the inner ends of a pair of push arms 14 for the receptacle 16.

Push arms 14 extend rearwardly and downwardly and at their outer ends are pivotally attached to alined, horizontal shafts 26 journaled in side plates 15 attached to the receptacle 16 near the bottom thereof. As here shown, receptacle 16 is a digging bucket and has a closed bottom, an open mouth, and alternately useable digging edges 48 and 49.

Secured to the other faces of the tractor plates 12 at the lower ends thereof are stub shafts 17 on which are pivoted bearing members 18 carried by the lower ends of a pair of hydraulic ram cylinders 19. The piston rods 20 of the hydraulic rams are provided at their upper ends with bearings 21 which are rotatably mounted on alined, horizontal stub shafts 22 journaled in the outer faces of the push arms 14 in proximity to the bearing shafts 13 for the inner ends of the push arms 14.

Journaled in the upper ends of the side plates 12 are alined, horizontal stub shafts 23, which are preferably arranged parallel to and spaced forwardly of the pivot shafts 13 for the inner ends of the push arms. Rotatably mounted on the stub shafts 23 are bearings 24 formed on the inner ends of a pair of bucket positioning arms 25 which extend rearwardly and downwardly, and at their outer ends are pivotally attached to the bucket by means of alined, horizontal shafts 27 carried by the bucket plates 15. The outer ends of the positioning arms 25 are located above and forwardly of the outer ends of the push arms 14, and the bucket 16 itself is pivotally mounted on the side plates 15 by alined, horizontal pivot shafts 28 carried by the side plates 15 above the pivots 27 for the outer ends of the positioning arms 25.

Thus, the pair of push arms 14 and the pair of positioning arms 25 are separately pivoted to the sides of the tractor and to the receptacle, respectively, and are rotated in unison about their respective pivots 13 and 23 on the tractor by means of the hydraulic rams 19 so as to swing the bucket 16 in an overhead path from one end of the tractor to the other.

The relationship of the pivots 13 and 23 and 26 and 27 to each other is such that as the push arms and the positioning arms are moved from ground level at one end of the vehicle to substantially vertical position the receptacle will be revolved on its own pivots in the same direction as the two sets of arms are revolved during the first part of the lifting movement of said arms and receptacle and will be revolved in the opposite direction from the revolution of said arms during the final part of the lift. Thus when the two sets of arms pass through the vertical and approach ground level at the opposite end of the vehicle the receptacle which at the start of the lifting cycle was positioned for digging at one end of the vehicle with its bottom edge 48 disposed toward the ground will be automatically re-positioned for digging at the opposite end of the vehicle with its opposite edge 49 disposed towards the ground for digging (see full and dotted line showing of Fig. 2).

Secured to and extending transversely between the bucket positioning arms 25 adjacent their outer ends is a shaft 29 on which is rotatably mounted a sleeve 30 (see Fig. 5). Fast to the ends of sleeve 30 are arms 31, the free ends of which are pivoted to the lower ends of a pair of bucket control links 32. Control links 32 extend upwardly and forwardly (see Fig. 6) and at their forward ends are pivotally attached to an actuating lever 33 which is pivoted intermediate its ends to a pivot shaft 34 carried by one of the bucket positioning arms 25. The free end of lever 33 is pivotally attached to the outer end of the piston rod 35 of a ram cylinder 36 which may be pivotally mounted on one of the stub shafts 23 for one of the bucket positioning arms 25.

Fast on sleeve 30 adjacent the ends thereof is a pair of arms 37 (see Fig. 5), the free ends of which are pivotally attached to the forward ends of a pair of arms 38. The rear ends of arms 38 are pivotally attached to a pair of arms 39 secured to the bottom of the bucket 16 so that when the piston rod 35 of ram cylinder 36 is actuated in one direction bucket 16 is revolved about its pivots 28 to tilt the same downwardly for dumping, as shown in dotted lines in Fig. 3 and to restore it to position.

The hydraulic circuit for the rams 19 and 36 is detailed in Fig. 4 and includes a reservoir 40 for oil or other pressure fluid connected to a pump 41 driven from the tractor engine or by any other suitable means. Reservoir 40 is connected to the ram cylinders 19 and 36 through a system of piping 42 within which is interposed control valves 43 and 44 operated by levers 45 and 46 mounted adjacent to the seat 47 for the tractor operator. Valve 43 controls the operation of the ram cylinders 19 and valve 44 controls the operation of the ram cylinder 36.

When in the position shown in Fig. 4, the piston 50 of valve 43 is so disposed that the plungers 20 of ram cylinders 19 are in bucket holding position, such for example, as that shown in full lines in Figs. 2 and 3, and oil passes from the pump 41 by way of feed pipe 51, through the valve body 43, and back to tank 40 through pipe 52. In this position of the parts, the entrance and exit of the pressure fluids from the cylinders 19 is blocked at the points 53 and 54 and hence the push arms 14 and the positioning arms 25 are held in a fixed position. To lift or rotate the arms 14 and 25 so as to swing the bucket 16 through an arc to or past vertical dumping position, the piston 50 of valve 43 is moved to a position where oil flows from the pump 41 by way of pipe 51, through the valve body 43, and out through pipes 55 and 56 to the cylinders 19.

When it is desired to operate the ram cylinder 36 to tilt the bucket downwardly to dump it or to restore it to position, the piston 57 of valve 44 is moved to a position where oil flows from one side of the piston within said cylinder 36 by way of pipe 58, through the valve 44, and back through pipe 59 to the other side of the piston within said cylinder 36.

When used as an overhead shovel, the operator runs the tractor backwardly to force the digging edge 48 of the bucket 16 into the pile of material to be loaded until the bucket 16 is filled. He then manipulates lever 45 for control valve 43 to establish a flow of oil, or other suitable fluid, from the pump 41 through the valve 43 and into the lower ends of the ram cylinders 19. This action forces the plungers 20 of such ram cylinders upwardly, as viewed in Figs. 1 and 2, and rotates the bucket push arms 14 and bucket positioning arms 25 about their pivots 13 and 23, respectively in a direction to cause the bucket at the outer ends of said pairs of arms to move upwardly in an arcuate path.

During this movement the bucket 16 travels in approximately upright position so that no spilling of the load takes place. As the outer ends of the arms 14 and 25 arrive at the vertical, the lifting power is discontinued either manually by the operator or automatically as disclosed in my aforesaid patent. In either case, the arms are free to pass through the vertical position by momentum after which they continue their downward descent either by gravity in case of a one way jack or under positive down pressure in the case of a two way jack, until their descent is halted by the manual discontinuance of the circulation of fluid in the hydraulic system.

When the arms 14 and 25 swing past the vertical, the ram cylinder 36 pivots on its pivot bearing 23, and during the continued downward movement of said pairs of arms toward the dash line position in Fig. 2, assist to maintain the bucket in non-spilling position. The operator may now dump the load from the bucket 16 by manipulating valve 44 to cause the piston of ram 36 to actuate the lever 33 and links 32 and thereby rotate the bucket 16 downwardly on its pivots 28 to the dumping position shown in dash lines in Fig. 3.

The position of the parts shown in Fig. 3 may also be considered as those which the parts will assume when the tractor is operated to dig and dump at the front end of the tractor.

While I have shown a double acting ram capable of lifting the arms and bucket and also applying power in the downward motion of the bucket after it has passed the vertical position, it will be obvious that I may use a single acting ram which will lift the bucket to the vertical position and permit it to fall by momentum and gravity.

I refer to the arms against which the force of hydraulic rams 19 are applied as the "push arms" and to the other pair of arms as the "pivot arms." It will be apparent to those skilled in the art that the lifting force of the rams 19 may be applied to one set of arms or the other and that the terminology herein employed to differentiate the two arms is merely for the purpose of convenience.

The invention has been shown and described somewhat in detail, but various modifications in the construction, and arrangement of parts, and in the operation may be resorted to within the spirit and scope of the invention as defined by the appended claims.

I claim:

1. In combination with a self propelled tractive vehicle, a material handling receptacle, a pair of receptacle push arms and a pair of receptacle positioning arms separately pivoted at their inner ends to the sides of the vehicle and separately pivoted at their outer ends to said receptacle, said pairs of arms being of a shape and length to carry said receptacle in a vertical arc from ground level position at either end of said vehicle to ground level at the opposite end of the vehicle, the pivot points of said pairs of arms being so disposed with relation to each other that as the arms are moved from ground level at one end of the vehicle to substantially vertical position the receptacle is revolved on its own pivots in the same direction as the arms are revolved during the first part of the lifting movement of the arms and receptacle from the ground and is revolved in the opposite direction from the revolution of the arms during the final part of the lift so that when the sets of arms pass through the vertical and approach ground level at the opposite end of the vehicle the receptacle which at the start of the lifting cycle was positioned for digging at one end of the vehicle with its bottom edge disposed toward the ground is automatically re-positioned for digging at the opposite end of the vehicle with its opposite edge disposed towards the ground, power lifting means for revolving said receptacle and arms from positions on either side of the vertical to an approximately vertical position, means comprising a pair of hydraulic rams, the cylinders of which are pivoted to the sides of the vehicle at points below the pivot points for the inner ends of the push arms and the plungers of which are attached to the push arms at points intermediate of the ends of the push arms, and means for discontinuing the application of lifting power to said receptacle as it approaches its vertical position from either end of the vehicle so that it may be free to pass the vertical by momentum and continue its revolution therefrom.

2. In combination with a tractor, a receptacle, a pair of receptacle push arms and a pair of receptacle positioning arms separately pivoted at their inner ends to the sides of the tractor and separately pivoted at their outer ends to said receptacle, said pairs of arms being of a shape and length to carry said receptacle in a vertical arc from ground level position at either end of said tractor to ground level at teh opposite end of said tractor, the pivot points for said pairs of arms being so disposed with relation to each other that as the arms are moved from ground level at one end of the tractor to substantially vertical position the receptacle is revolved on its own pivots in the same direction as the arms are revolved during the first part of the lifting movement of the receptacle and arms from the ground and is revolved in the opposite direction during the final part of the lift whereby to reverse the position of the receptacle when it reaches ground level at the opposite end of the tractor, power lifting means for revolving said receptacle and arms, and means comprising hydraulic rams, the cylinder of which is pivoted to the side of the vehicle and the plunger of which is attached to one of said receptacle positioning arms.

3. In combination with a self propelled tractive vehicle, a material handling receptacle, a pair of receptacle push arms and a pair of receptacle positioning arms separately pivoted at their inner ends to the sides of the vehicle and separately pivoted at their outer ends to said receptacle, said pairs of arms being of a shape and length to carry said receptacle in a vertical arc from ground level at either end of said vehicle to ground level at the opposite end of the vehicle, the pivot points of said arms being so disposed with relation to each other that as the arms are moved from ground level at one end of the vehicle to substantially vertical position the receptacle is revolved on its own pivots in the same direction as the arms are revolved during the first part of the lifting movement of the arms and receptacle from the ground and is revolved in the opposite direction during the final part of the lift whereby to reverse the position of the receptacle when it reaches ground level at the opposite end of the vehicle, and a pair of hydraulic rams for revolving said receptacle and arms, the cylinders of which are pivoted to the sides of the vehicle at points below and substantially in vertical alignment with the pivot points for the inner ends of the push arms and the plungers of which are attached to the push arms at points intermediate the ends of the push arms, and means for tilting the loaded receptacle on its pivots to dump it at the end of the lifting cycle and for restoring it to position after dumping, comprising a hydraulic ram, the cylinder of which is pivoted to the side of the vehicle and the plunger of which is attached to one of the receptacle positioning arms.

4. In combination with a self propelled tractive vehicle, a material handling receptacle, a pair of receptacle push arms and a pair of receptacle positioning arms separately pivoted at their inner ends to the sides of the vehicle and separately pivoted at their outer ends to said receptacle, said pairs of arms being of a shape and length and said pivots spaced to permit passage to carry said receptacle in a vertical arc from ground level position at either end of said vehicle to ground level at the opposite end of the vehicle, the pivot points of said pairs of arms being so disposed with relation to each other that as the arms are moved from ground level at one end of the vehicle to substantially vertical position the receptacle is revolved on its own pivots in the same direction as the arms are revolved during the first part of the lifting movement of the arms and receptacle from the ground and is revolved in the opposite direction from the revolution of the arms during the final part of the lift so that when the sets of arms pass through the vertical and approach ground level at the opposite end of the vehicle the receptacle which at the start of the lifting cycle was positioned for digging at one end of the vehicle with its bottom edge disposed toward the ground is thereby re-positioned for digging at the opposite end of the vehicle with its opposite edge disposed towards the ground, and power lifting means comprising a pair of hydraulic rams, and push arms pivotally connected between the vehicle and push arms at points on the vehicle substantially below the pivot points of the push arms and at a point on each push arm intermediate of the ends of the push arms.

5. In combination with a tractor, a receptacle, a pair of receptacle push arms and a pair of receptacle positioning arms separately pivoted at their inner ends to the sides of the tractor and separately pivoted at their outer ends to said receptacle, said pairs of arms being of a shape and length to carry said receptacle in a vertical arc from ground level position at either end of said tractor to ground level at the opposite end of said tractor, the pivot points for said pairs of arms being so disposed with relation to each other that as the arms are moved from ground level at one end of the tractor to substantially vertical position the receptacle is revolved on its own pivots in the same direction as the arms are revolved during the first part of the lifting movement of the receptacle and arms from the ground and is revolved in the opposite direction during the final part of the lift whereby to reverse the position of the receptacle when it reaches ground level at the opposite end of the tractor, power lifting means for revolving said receptacle and arms, means for tilting the loaded receptacle to dump it comprising a link pivotally connected to one of said receptacle positioning arms, a hydraulic ram pivotally connected between the said link and vehicle positioned and adapted to apply tilting force to the said link.

6. In combination with a self propelled tractive vehicle, a material handling receptacle, a pair of receptacle push arms and a pair of receptacle positioning arms separately pivoted to said receptacle, said pairs of arms adapted to carry said receptacle in a vertical arc from ground level position at one end of the vehicle to a dumping position at the other end of the vehicle, said pairs of arms being further adapted to revolve the receptacle on its own pivots in the same direction as the arms are revolved during the first part of the lifting movement of the arms and receptacle from the ground, and to revolve the receptacle on its own pivots in the opposite direction from the revolution of the arms during the final part of the lift, hydraulic power lifting means adapted to apply lifting force to the said push arms from a point substantially below the pivot points of said push arms on the vehicle to points intermediate of the ends of the said push arms.

TENGEL ANDERSEN.

REFERENCES CITED

The following references are of record in the file of this patent:

UNITED STATES PATENTS

| Number | Name | Date |
|---|---|---|
| 1,141,928 | Brown | June 8, 1915 |
| 1,441,700 | Middlemiss | Jan. 9, 1923 |
| 2,296,827 | Andersen et al. | Sept. 29, 1942 |
| 2,427,968 | Hoover | Sept. 23, 1947 |
| 2,463,675 | Beyerstedt | Mar. 8, 1949 |